Nov. 3, 1959 L. J. HARKE 2,911,603
THREE-PHASE CORES FOR ELECTRICAL INDUCTION APPARATUS
Filed Feb. 8, 1954

Leroy J. Harke,
Inventor.
Koenig and Pope,
Attorneys

United States Patent Office 2,911,603
Patented Nov. 3, 1959

2,911,603

THREE-PHASE CORES FOR ELECTRICAL INDUCTION APPARATUS

Leroy J. Harke, St. Louis, Mo., assignor to Moloney Electric Company, St. Louis, Mo., a corporation of Delaware Application February 8, 1954, Serial No. 408,866

3 Claims. (Cl. 336—5)

This invention relates generally to three-phase electrical induction apparatus and more specifically to core structures for three-phase electrical induction apparatus, the predominant object of the invention being to provide a three-phase core structure which is capable of performing its intended function with greater efficiency than the three-phase core structures heretofore known, and which is of reduced size and weight when compared with the earlier three-phase core structures.

Figure 1:
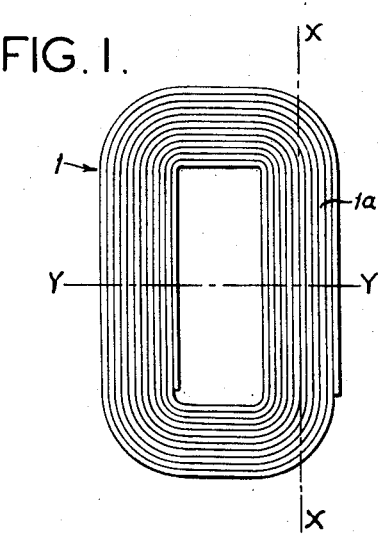
Fig. 1 is an elevation of a magnetic loop, two of such loops being utilized for the production of a three-phase core in accordance with this invention.
Figure 4:
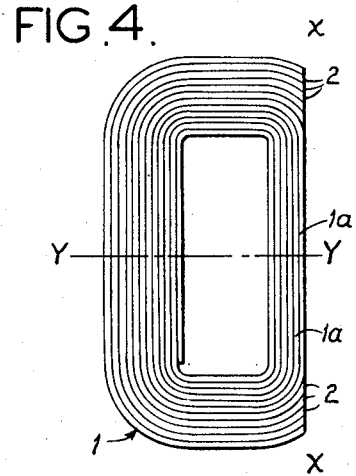
Fig. 4 is a view similar to Fig. 1 but showing a magnetic core loop after it has been cut.

In producing a three-phase core structure in accordance with this invention, the finished core structure is produced from two magnetic core loops 1 which preferably are wound from continuous strips of magnetic core steel which provide throughout the loop structures a multiplicity of layers of said magnetic core steel. Each magnetic core loop is bonded with a suitable bonding material and each magnetic core loop is cut along the line X—X of Figs. 1 and 2, this cut X—X serving to remove one-half of the thickness of the leg 1ª of the magnetic core loop 1. The cut X—X passes through opposed curved portions of the layers of magnetic steel which produce the opposite connecting yokes of the magnetic core loop and cross-sectional faces 2 of said layers are exposed, to perform a function in a manner to be hereinafter set forth. Also, the magnetic core loops are subsequently cut on the line Y—Y, these cuts traversing the winding legs of each loop at any desired point along their length, for instance, at the approximate longitudinal center of said winding legs so as to divide the loop into two loop portions 1ᵇ.

Figure 2:
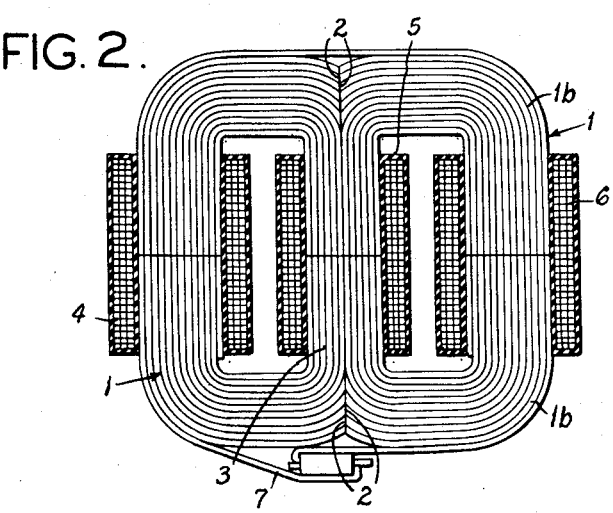
Fig. 2 is an elevation of a three-phase core structure made in accordance with this invention.

The two magnetic core loops 1 of which the improved magnetic core structure of this invention is comprised, are assembled as shown in Fig. 2, that is to say, the faces of the two magnetic core loops 1 formed by the cuts along X—X are brought together into contact with each other which will bring two longitudinally extended layers of the magnetic steel of middle winding leg 3 of the three-phase core structure into contact with each other, and, also, corresponding cross-sectional faces 2 of the yokes of the respective magnetic core loops 1 will be brought together to provide butt joints between said cross-sectional faces of said respective magnetic core loops. The assembled core loops 1 are then bonded with the aid of a suitable bonding material, by impregnation and baking to produce a solid core, after which the core is cut on the line Y—Y to produce the core portions 1ᵇ which are substantially of E-shaped formation.

Figure 3:
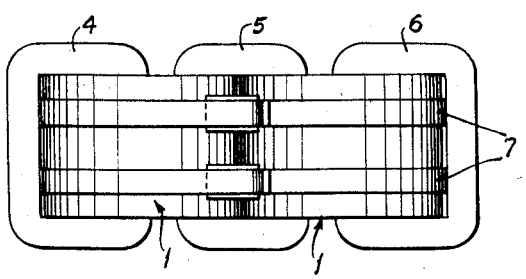
Fig. 3 is an inverted plan view of the three-phase core structure shown in Fig. 2.

The windings 4, 5, and 6 are then assembled with the core as shown in Fig. 2, portions of the two outer winding legs and the middle winding leg being extended into the bores of the windings, and faces of said outer winding legs and said middle winding leg at the cut Y—Y meeting to provide butt joints between opposed portions of the winding legs of the core structure. In order to retain the core structure in its assembled condition, a pair of steel bands 7 are arranged about said core structure, as shown in Figs. 2 and 3, said bands being drawn taut and placed under tension about the core structure, and the free ends of said bands being connected together by suitable couplings. The bands 7 serve to produce effective butt joints between the contacting end faces of the winding legs of the core structure, and by producing a core structure in accordance with this invention, the three winding legs thereof are of equal cross-sectional area and the flux path is substantially parallel with the direction of the winding strips from which the core loops, which comprise the core structure, are formed.

I claim:

1. A magnetic core structure comprising two core loops joined together side-by-side thereby providing two outer winding legs and an intermediate winding leg, said loops having contiguous opposed faces in said intermediate leg, each of said loops comprising an inner wound-strip portion and an outer portion which consists of contiguous superimposed laminated strips partially surrounding the wound-strip portion, each of said strips in the outer portion of each loop terminating substantially at said face of the loop, the innermost strip of each outer portion being contiguous to the respective inner wound-strip portion throughout the length of said innermost strip.

2. In a three-phase electrical induction apparatus comprising a three-legged magnetic core structure and three windings, one on each of the three legs of the magnetic core structure, said core structure comprising two core loops joined together side-by-side thereby providing two outer winding legs and an intermediate winding leg, said loops having contiguous opposed faces in said intermediate leg, each of said loops comprising an inner wound-strip portion and an outer portion which consists of contiguous superimposed laminated strips partially surrounding the wound-strip portion, each of said strips in the outer portion of each loop terminating substantially at said contiguous face of the loop, the innermost strip of each outer portion being contiguous to the respective inner wound-strip portion throughout the length of said innermost strip, said core structure being split in a plane transverse to the legs, and means for holding the split portions of the core structure in assembled relation.

3. In a three-phase electrical induction apparatus comprising a three-legged magnetic core structure and three windings, one on each of the three legs of the magnetic core structure, said core structure comprising two rectangular core loops joined together side-by-side thereby providing two outer winding legs and an intermediate winding leg, said loops having contiguous opposed faces in said intermediate leg in a plane substantially parallel to said intermediate leg, each of said loops comprising an inner wound-strip portion of rectangular form with rounded corners and an outer portion which consists of contiguous superimposed laminated strips surrounding three sides of the wound-strip portion, each of said strips in the outer portion of each loop terminating substantially at said contiguous face of the loop, the innermost strip of each outer portion being contiguous to the respective inner wound-strip portion throughout the length of said innermost strip and the end portions of said strips being inwardly curved toward said contiguous faces so that the end portions of said strips form inwardly directed cusps, said core structure being split in a plane transverse to the legs, and means for holding the split portions of the core structure in assembled relation.

References Cited in the file of this patent

UNITED STATES PATENTS

| | | |
|---|---|---|
| 2,344,294 | Evans | Mar. 14, 1944 |
| 2,382,172 | Putman et al. | Aug. 14, 1945 |
| 2,400,994 | Horstman et al. | May 28, 1946 |
| 2,431,128 | Link | Nov. 18, 1947 |
| 2,542,806 | Ford et al. | Feb. 20, 1951 |
| 2,543,089 | Zimsky | Feb. 27, 1951 |